US008104276B2

(12) United States Patent
Lee

(10) Patent No.: US 8,104,276 B2
(45) Date of Patent: Jan. 31, 2012

(54) HYDRAULIC CIRCUIT TO PREVENT BUCKET SEPARATION FROM BUCKET REST DURING TRAVELING OF HEAVY EQUIPMENT

(75) Inventor: Byung Ho Lee, Kyungsangnam-do (KR)

(73) Assignee: volvo Construction Equipment Holding Sweden AB, Eskilstuna (SE)

(*) Notice: Subject to any disclaimer, the term of this patent is extended or adjusted under 35 U.S.C. 154(b) by 897 days.

(21) Appl. No.: 12/075,590

(22) Filed: Mar. 12, 2008

(65) Prior Publication Data

US 2008/0229738 A1 Sep. 25, 2008

(30) Foreign Application Priority Data

Mar. 19, 2007 (KR) ........................ 10-2007-0026495

(51) Int. Cl.
*F16D 31/02* (2006.01)

(52) U.S. Cl. ........................................................ 60/421

(58) Field of Classification Search .................... 60/421, 60/422, 484, 486

See application file for complete search history.

(56) References Cited

U.S. PATENT DOCUMENTS 5,481,872 A * 1/1996 Karakama et al. .............. 60/421
5,485,724 A 1/1996 Nozawa et al.

FOREIGN PATENT DOCUMENTS

JP 4-258417 9/1992
JP 2000-129728 5/2000

* cited by examiner

*Primary Examiner* — Michael Leslie
(74) *Attorney, Agent, or Firm* — Ladas & Parry LLP

(57) ABSTRACT

A hydraulic circuit for preventing a change of stroke of a boom cylinder or an arm cylinder during transportation. The hydraulic circuit includes first and second hydraulic pumps, a boom cylinder, an arm cylinder, a boom confluence logic valve, a first port connected with a chamber of the boom cylinder in a housing in which a spool for the boom cylinder is shiftably installed, a second port connected with a hydraulic tank in the housing, and a first orifice formed between the housing and a land part of the spool for the boom cylinder located between the first port and the second port. During transportation, a small amount of hydraulic fluid fed from the second hydraulic pump to the large chamber of the boom cylinder drains to the hydraulic tank through the first orifice to prevent a change of stroke of the boom cylinder.

2 Claims, 3 Drawing Sheets

HYDRAULIC CIRCUIT TO PREVENT BUCKET SEPARATION FROM BUCKET REST DURING TRAVELING OF HEAVY EQUIPMENT

CROSS-REFERENCE TO RELATED APPLICATION

This application is based on and claims priority from Korean Patent Application No. 10-2007-0026495, filed on Mar. 19, 2007 in the Korean Intellectual Property Office, the disclosure of which is incorporated herein in its entirety by reference.

BACKGROUND OF THE INVENTION

1. Field of the Invention

The present invention relates to a hydraulic circuit that can prevent a bucket from being separated from a bucket rest during traveling of wheel type heavy equipment.

More particularly, the present invention relates to a hydraulic circuit to prevent a bucket separation from a bucket rest during long traveling of heavy equipment, which can prevent the bucket from being separated from the bucket rest by preventing a change of stroke of a boom cylinder or an arm cylinder during long traveling of the heavy equipment, and can secure safe driving since it is not required for an operator to adjust the position of boom and arm.

2. Description of the Prior Art

As illustrated in FIG. 1, a conventional hydraulic circuit includes first and second hydraulic pumps 1 and 2; actuators (e.g., a boom cylinder 3 and a bucket cylinder 4) installed in a flow path of the first hydraulic pump 1 to be driven during shifting of a spool 12 for the boom cylinder and a spool 18 for the bucket cylinder; actuators (e.g., a traveling motor 5, a swing motor 6, and an arm cylinder 7) installed in a flow path of the second hydraulic pump 2 to be driven during shifting of a spool 11 for the traveling motor, a spool 19 for the swing motor, and a spool 13 for the arm cylinder; a main control valve 8 installed in flow paths between the first and second hydraulic pumps 1 and 2 and the actuators to control a start, a stop, and a direction change of the corresponding actuators during shifting of the spools; and a boom confluence logic valve 10 installed in a confluence flow path 9 of the first and second hydraulic pumps 1 and 2 to make hydraulic fluid of the second hydraulic pump 2 join hydraulic fluid of the first hydraulic pump 1 being supplied to the boom cylinder 3 during shifting of a poppet inside the boom confluence logic valve 10.

If a manipulation lever (RCV) (not illustrated) is operated to lift up a boom, a poppet of the boom confluence logic valve 10 is shifted upward as shown in the drawing. Accordingly, the hydraulic fluid fed from the second hydraulic pump 2 joins the hydraulic fluid fed from the first hydraulic fluid 1 via the boom confluence logic valve 10, and the confluent fluid is supplied to a large chamber of the boom cylinder 3. Accordingly, the boom is rapidly lifted up to perform a smooth operation.

By contrast, if the boom-up operation is not performed, the confluence flow path 9 is blocked by the poppet of the boom confluence logic valve 10, and thus the supply of the hydraulic fluid from the second hydraulic pump 2 to the boom cylinder 3 is intercepted.

In the case where a wheel type heavy equipment travels for a long time to be used as a transportation means for moving to a workplace, the hydraulic fluid fed from the second hydraulic pump 2 by the operation of a traveling lever (or traveling pedal) is supplied to the traveling motor 5 via the spool 11 for the traveling motor. Other spools 12, 13, 18, and 19 for working devices, except for the spool 11 for the traveling motor, are kept in a neutral state.

At this time, since the boom confluence logic valve 10 is in a closed state, but the hydraulic fluid fed from the second hydraulic pump 2 is kept at high pressure, the hydraulic fluid is supplied to an inlet port of the spool 12 for the boom cylinder via an orifice of the boom confluence logic valve 10.

A very small amount of hydraulic fluid leaking through a gap between a land part of the spool 12 for the boom cylinder and the housing is supplied to a large chamber 3*a* of the boom cylinder 3. Accordingly, the boom is lifted up during traveling of the heavy equipment against an operator's intention.

Specifically, during long traveling of the equipment, a part of hydraulic fluid fed from the second hydraulic fluid 2 to the traveling motor 5 is supplied to the large chamber 3*a* of the boom cylinder 3 via the orifice of the boom confluence logic valve 10, and this causes the boom to be lifted up.

In addition, a part of high-pressure fluid fed from the second hydraulic pump 2 is also supplied to the arm cylinder 7 due to the leakage through the gap between the land part of spool and the housing, and thus the arm cylinder 7 is driven to be in an arm-in or arm-out state.

If the boom is lifted up due to the stroke change of the boom cylinder 3 or the arm is driven due to the stroke change of the arm cylinder 7 during long traveling of the heavy equipment in a state that the bucket is placed on the bucket rest (not illustrated), the bucket is separated from the bucket rest to allow free movement of the bucket, and this may disturb the operator's driving comfort & safety of the heavy equipment.

In this case, the operator may operate the boom to place the bucket in the bucket rest by changing a mode switch from a traveling mode to a working mode, and then change again the mode switch from the working mode to the traveling mode to resume the traveling of the heavy equipment. However, this may cause a safety accident to occur during traveling of the heavy equipment with the lowering of driveability.

SUMMARY OF THE INVENTION

Accordingly, the present invention has been made to solve the above-mentioned problems occurring in the prior art while advantages achieved by the prior art are maintained intact.

One object of the present invention is to provide a hydraulic circuit to prevent a bucket separation from a bucket rest during traveling of heavy equipment, which can prevent a bucket from being separated from the bucket rest by preventing a change of stroke of a boom cylinder or an arm cylinder during long traveling of the heavy equipment, and can secure safety with the improvement of driveability since it is not required for an operator to adjust the position of boom and arm during the traveling of the heavy equipment.

In order to accomplish the object, there is provided a hydraulic circuit to prevent a bucket separation from a bucket rest during traveling of heavy equipment, including first and second hydraulic pumps, a boom cylinder driven by shifting of a spool for the boom cylinder installed in a flow path of the first hydraulic pump, an arm cylinder driven by shifting of a spool for the arm cylinder installed in a flow path of the second hydraulic pump, and a boom confluence logic valve for making hydraulic fluid fed from the second hydraulic pump join hydraulic fluid of the boom cylinder, according to one aspect of the present invention, which comprises a first port formed to connect with a large chamber of the boom cylinder in a housing in which the spool for the boom cylinder is shiftably installed; a second port formed to connect with a hydraulic tank in the housing; and a first orifice formed between the housing and a land part of the spool for the boom cylinder located between the first port and the second port; wherein during long traveling of the heavy equipment, a very small amount of hydraulic fluid fed from the second hydraulic pump to the large chamber of the boom cylinder drains to the hydraulic tank through the first orifice to prevent a change of stroke of the boom cylinder.

The first orifice has a size larger than that of a second orifice formed between the housing and the land part of the spool for the boom cylinder located between a high-pressure flow path formed in the housing and the first port.

In another aspect of the present invention, there is provided a hydraulic circuit to prevent a bucket separation from a bucket rest during traveling of heavy equipment, including first and second hydraulic pumps, a boom cylinder driven by shifting of a spool for the boom cylinder installed in a flow path of the first hydraulic pump, an arm cylinder driven by shifting of a spool for the arm cylinder installed in a flow path of the second hydraulic pump, and a boom confluence logic valve for making hydraulic fluid fed from the second hydraulic pump join hydraulic fluid of the boom cylinder, which comprises a first port formed to connect with a large chamber of the arm cylinder in a housing in which the spool for the arm cylinder is shiftably installed; a second port formed to connect with a hydraulic tank in the housing; a third orifice formed between the housing and a land part of the spool for the arm cylinder located between the first port and the second port; a third port formed to connect with the a small chamber of the arm cylinder in the housing; a fourth port formed to connect with the hydraulic tank in the housing; and a fourth orifice formed between the housing and the land part of the spool for the arm cylinder located between the third port and the fourth port; wherein during long traveling of the heavy equipment, a very small amount of hydraulic fluid fed from the second hydraulic pump to the large chamber of the arm cylinder drains to the hydraulic tank through the third orifice or a very small amount of hydraulic fluid fed from the second hydraulic pump to the small chamber of the arm cylinder drains to the hydraulic tank through the fourth orifice to prevent a change of stroke of the arm cylinder.

The third orifice has a size larger than that of a fifth orifice formed between the housing and the land part of the spool for the arm cylinder located between a high-pressure flow path formed in the housing and the first port.

The fourth orifice has a size larger than that of a sixth orifice formed between the housing and the land part of the spool for the arm cylinder located between a high-pressure flow path formed in the housing and the third port.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 2:
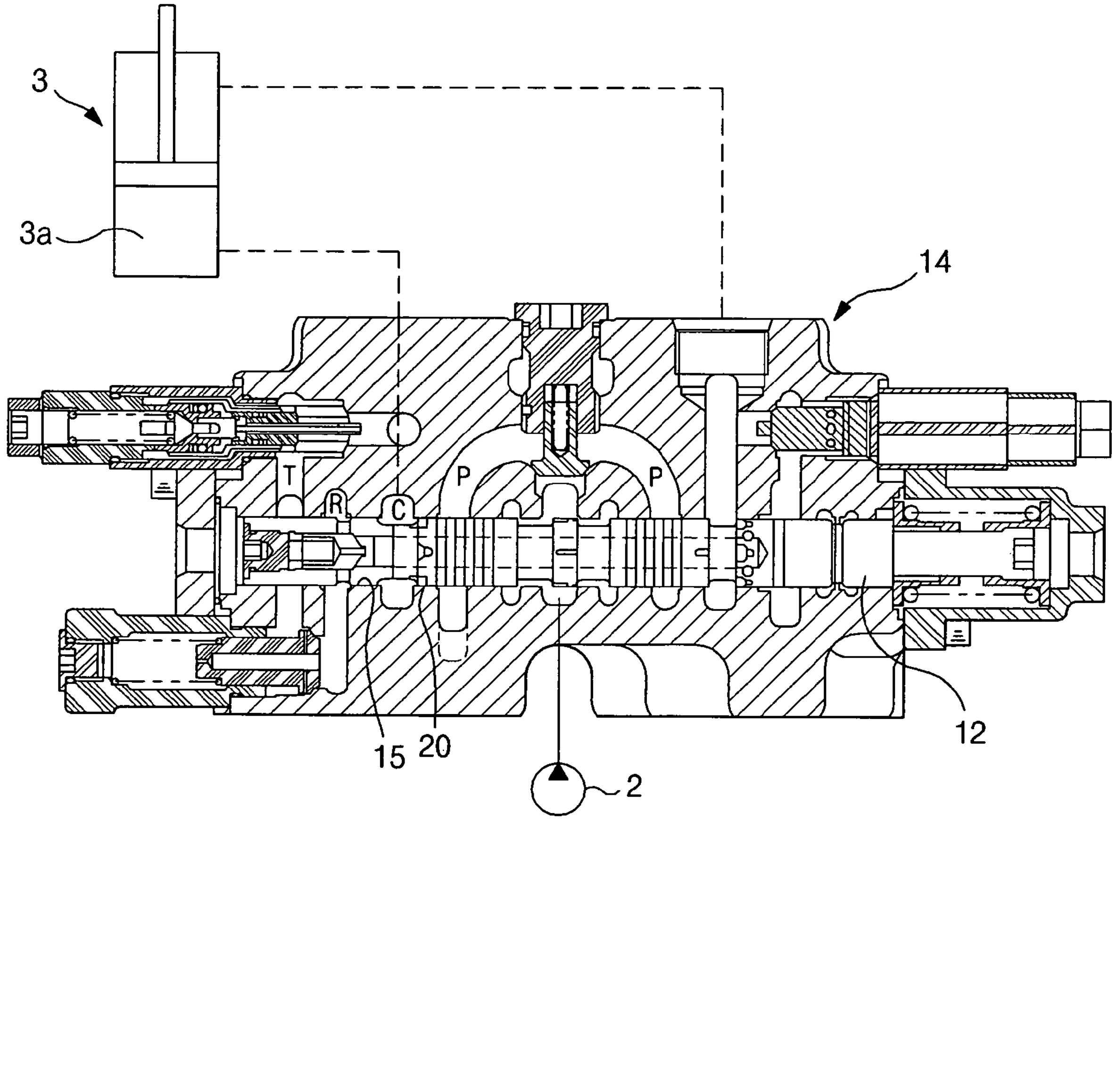
FIG. 2 is a sectional view explaining prevention of a fine drive of a boom cylinder during traveling of heavy equipment according to an embodiment of the present invention.

As illustrated in FIG. 2, a hydraulic circuit to prevent a bucket separation from a bucket rest during traveling of heavy equipment, according to an embodiment of the present invention, includes first and second hydraulic pumps 1 and 2, a boom cylinder 3 driven by shifting of a spool 12 for the boom cylinder installed in a flow path of the first hydraulic pump 1, an arm cylinder 7 driven by shifting of a spool 13 for the arm cylinder installed in a flow path of the second hydraulic pump 2, and a boom confluence logic valve 10 for making hydraulic fluid fed from the second hydraulic pump 2 join hydraulic fluid of the boom cylinder 3.

The hydraulic circuit according to an embodiment of the present invention also includes a first port C formed to connect with a large chamber 3*a* of the boom cylinder 3 in a housing 14 in which the spool 12 for the boom cylinder is shiftably installed, a second port R formed to connect with a hydraulic tank T in the housing 14, and a first orifice 15 formed between the housing 14 and a land part of the spool 12 for the boom cylinder located between the first port C and the second port R.

During long traveling of the heavy equipment, a very small amount of hydraulic fluid, which is fed from the second hydraulic pump 2 to the large chamber 3*a* of the boom cylinder 3 through the orifice of the boom confluence logic valve 10 and the first port C, drains to the hydraulic tank T through the first orifice 15 and the second port R to prevent a change of stroke of the boom cylinder 3.

Figure 1:
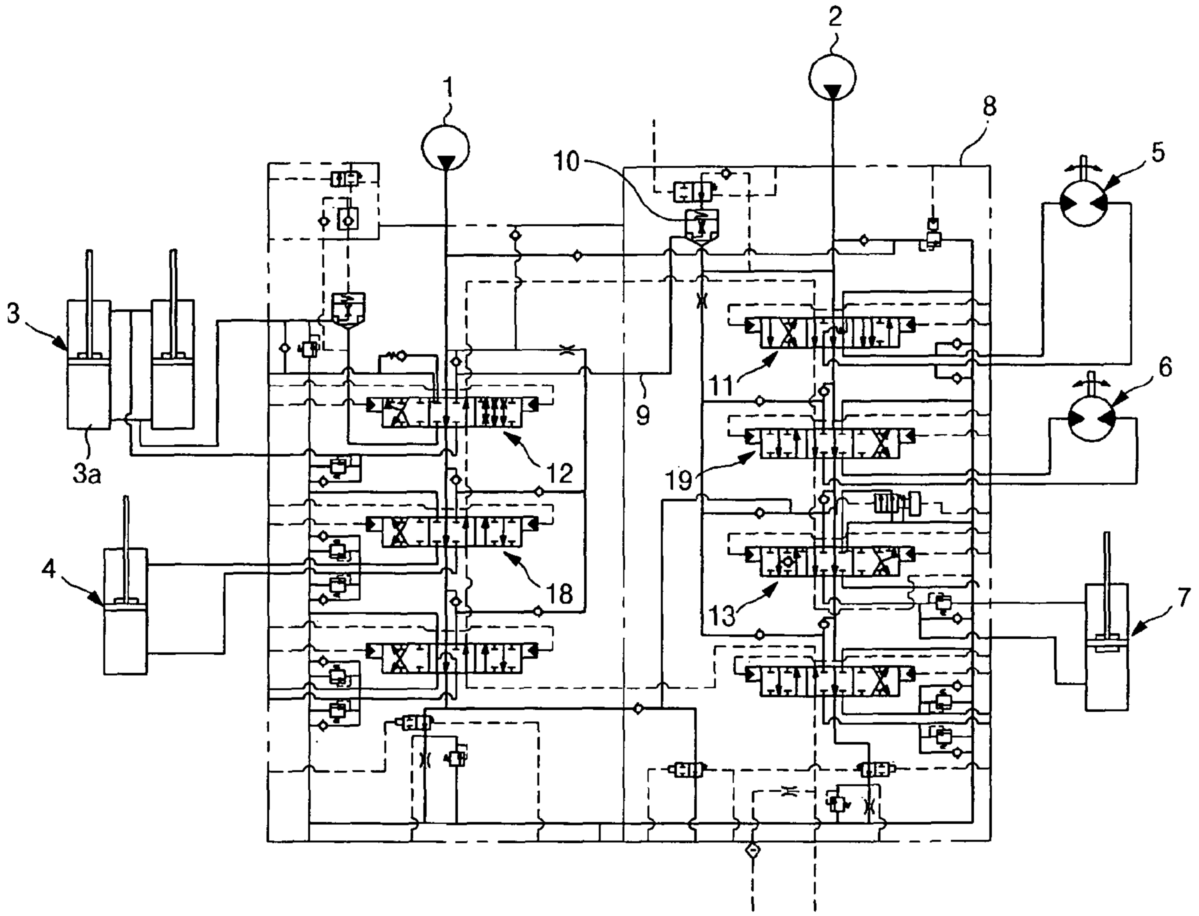
Fig. 1 Prior Art
FIG. 1 is a hydraulic circuit diagram of a conventional hydraulic circuit.

In this case, the construction including the second hydraulic pump 2, the boom cylinder 3, and the spool 12 for the boom cylinder is substantially equal to the construction as illustrated in FIG. 1, and thus the detailed description thereof will be omitted. In the description of the present invention, the same drawing reference numerals are used for the same elements across various figures.

Hereinafter, the operation of the hydraulic circuit to prevent a bucket separation from a bucket rest during traveling of heavy equipment, according to an embodiment of the present invention, will be described with reference to the accompanying drawings.

As illustrated in FIG. 2, a part of high-pressure hydraulic fluid fed from the second hydraulic pump 2 is supplied to a high-pressure flow path P of the housing 14 in which the spool 12 for the boom cylinder is installed to be kept in a neutral state. The hydraulic fluid supplied to the high-pressure flow path P leaks to the first port C through a second orifice 20 formed between the high-pressure flow path P and the first port C.

The hydraulic fluid leaking to the first port C flows to the second port R through the first orifice 15 formed between the first port C and the second port R, and then drains to the hydraulic tank T.

In this case, the first orifice 15 is formed to have a size larger than that of the second orifice 20 (i.e., a gap formed between the housing 14 and the land part of the spool 12 for the boom cylinder located between the high-pressure path P and the first port C) formed between the high-pressure path P and the first port C.

Accordingly, if a very small amount of hydraulic fluid fed to the high-pressure flow path P during traveling leaks to the first port C connected with the large chamber 3_a_ of the boom cylinder 3 through the second orifice 20, the hydraulic fluid leaking to the first port C drains to the hydraulic tank T through the first orifice 15. At this time, since the size of the first orifice 15 is larger than that of the second orifice 20, the hydraulic fluid leaking to the first port C is rapidly discharged to the hydraulic tank T.

Accordingly, the supply of a very small amount of hydraulic fluid, which is fed to the high-pressure flow path P, to the large chamber 3_a_ of the boom cylinder 3 is intercepted, and thus the change of stroke of the boom cylinder 3 is prevented.

During long traveling of the heavy equipment, all spools except for the spool 11 for the traveling motor are kept in a neutral state, and a very small amount of hydraulic fluid, which is fed from the second hydraulic pump 2 to the boom cylinder 3, drains to the hydraulic tank T, so that the fine drive of the boom cylinder 3 is prevented.

Accordingly, even in the case where the wheel type heavy equipment travels for a long time, the fine drive of the boom cylinder 3 is prevented, and thus the bucket is prevented from seceding from the bucket rest.

Figure 3:
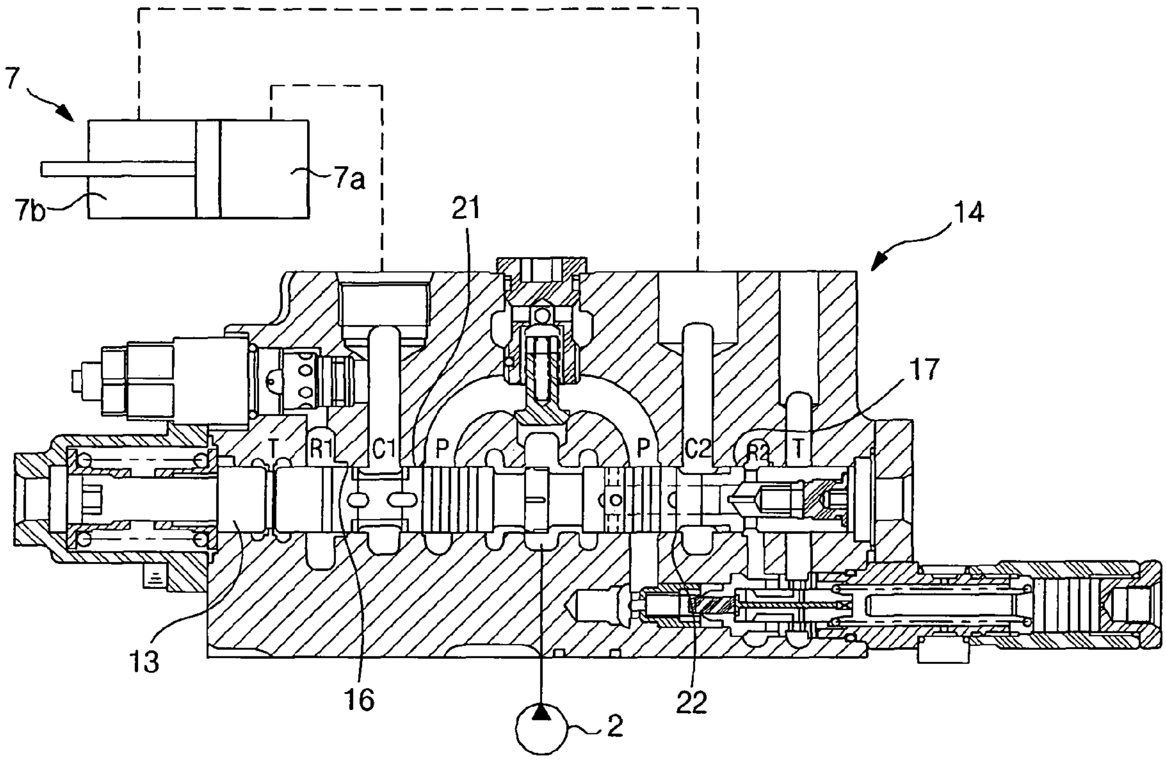
FIG. 3 is a sectional view explaining prevention of a fine drive of a boom cylinder during traveling of heavy equipment according to another embodiment of the present invention.

As illustrated in FIG. 3, a hydraulic circuit to prevent a bucket separation from a bucket rest during traveling of heavy equipment, according to another embodiment of the present invention, includes first and second hydraulic pumps 1 and 2, a boom cylinder 3 driven by shifting of a spool 12 for the boom cylinder installed in a flow path of the first hydraulic pump 1, an arm cylinder 7 driven by shifting of a spool 13 for the arm cylinder installed in a flow path of the second hydraulic pump 2, and a boom confluence logic valve 10 for making hydraulic fluid fed from the second hydraulic pump 2 join hydraulic fluid of the boom cylinder 3.

The hydraulic circuit according to another embodiment of the present invention also includes a first port C1 formed to connect with a large chamber 7_a_ of the arm cylinder 7 in a housing 14 in which the spool 13 for the arm cylinder is shiftably installed, a second port R1 formed to connect with a hydraulic tank T in the housing 14, a third orifice 16 (i.e., a gap formed between the housing 14 and a land part of the spool 13 for the arm cylinder) formed between the housing 14 and a land part of the spool 13 for the arm cylinder located between the first port C1 and the second port R1, a third port C2 formed to connect with the a small chamber 7_b_ of the arm cylinder 7 in the housing 14, a fourth port R2 formed to connect with the hydraulic tank T in the housing 14, and a fourth orifice 17 (i.e., a gap formed between the housing 14 and the land part of the spool 13 for the arm cylinder) formed between the housing 14 and the land part of the spool 13 for the arm cylinder located between the third port C2 and the fourth port R2.

During long traveling of the heavy equipment, a very small amount of hydraulic fluid, which is fed from the second hydraulic pump 2 to the large chamber 7_a_ of the arm cylinder 7 through the first port C1 due to the spool leakage, drains to the hydraulic tank T through the third orifice 16 and the second port R1, or a very small amount of hydraulic fluid, which is fed from the second hydraulic pump 2 to the small chamber 7_b_ of the arm cylinder 7 through the third port C2 due to the spool leakage, drains to the hydraulic tank T through the fourth orifice 17 and the fourth port R2 to prevent a change of stroke of the arm cylinder 7.

In this case, the construction including the second hydraulic pump 2, the arm cylinder 7, and the spool 13 for the arm cylinder is substantially equal to the construction as illustrated in FIG. 1, and thus the detailed description thereof will be omitted. In the description of the present invention, the same drawing reference numerals are used for the same elements across various figures.

Hereinafter, the operation of the hydraulic circuit to prevent a bucket separation from a bucket rest during traveling of heavy equipment, according to another embodiment of the present invention, will be described with reference to the accompanying drawings.

As illustrated in FIG. 3, a part of high-pressure hydraulic fluid fed from the second hydraulic pump 2 is supplied to a high-pressure flow path P of the housing 14 in which the spool 13 for the arm cylinder is installed to be kept in a neutral state. The hydraulic fluid supplied to the high-pressure flow path P leaks to the first port C1 through a fifth orifice 21 formed between the high-pressure flow path P and the first port C1.

The hydraulic fluid leaking to the first port C1 flows to the second port R1 through the third orifice 16 formed between the first port C1 and the second port R1, and then drains to the hydraulic tank T.

In this case, the third orifice 16 is formed to have a size larger than that of the fifth orifice 21 (i.e., a gap formed between the housing 14 and the land part of the spool 13 for the arm cylinder located between the high-pressure path P and the first port C1) formed between the high-pressure path P and the first port C1.

Accordingly, if a very small amount of hydraulic fluid, which is fed from the second hydraulic pump 2 to the high-pressure flow path P due to the spool leakage, leaks to the first port C1 connected with the large chamber 7_a_ of the arm cylinder 7 through the fifth orifice 21, the hydraulic fluid leaking to the first port C1 drains to the hydraulic tank T through the third orifice 16.

Accordingly, the supply of a part of hydraulic fluid, which is fed to the high-pressure flow path P during traveling, to the large chamber 7_a_ of the arm cylinder 7 is intercepted, and thus the stroke-out of the arm cylinder 7 is prevented.

On the other hand, a part of high-pressure hydraulic fluid fed from the second hydraulic pump 2 to the high-pressure flow path P leaks to the third port C2 through a sixth orifice 22 (i.e., a gap formed between the housing 14 and the land part of the spool 13 for the arm cylinder located between the high-pressure path P and the third port C2) formed between the high-pressure flow path P and the second port C2.

The hydraulic fluid leaking to the third port C2 drains to the hydraulic tank T through the fourth orifice 17 formed between the third port C2 and the fourth port R2. In this case, the fourth orifice 17 is formed to have a size larger than that of the sixth orifice 22 formed between the high-pressure path P and the third port C2.

Accordingly, if a very small amount of hydraulic fluid, which is fed from the second hydraulic pump 2 to the high-pressure flow path P due to the spool leakage, leaks to the third port C2 connected with the small chamber 7_b_ of the arm cylinder 7 through the sixth orifice 22, the hydraulic fluid leaking to the third port C2 drains to the hydraulic tank T through the fourth orifice 17.

Accordingly, the supply of a part of the hydraulic fluid, which is fed to the high-pressure flow path P during traveling, to the small chamber 7_b_ of the arm cylinder 7 is intercepted, and thus the stroke-in of the arm cylinder 7 is prevented.

As described above, during long traveling of the heavy equipment, all spools except for the spool 11 for the traveling motor are kept in a neutral state, and a very small amount of hydraulic fluid, which is fed from the second hydraulic pump 2 to the arm cylinder 7, drains to the hydraulic tank T, so that the change of stroke of the arm cylinder 7 is prevented.

Accordingly, even in the case where the wheel type heavy equipment travels for a long time, the bucket is prevented from seceding from the bucket rest due to the change of stroke (i.e., stroke-out or stroke-in) of the arm cylinder 7.

From the foregoing, it will be apparent that the hydraulic circuit to prevent a bucket separation from a bucket rest during traveling of heavy equipment, according to embodiments of the present invention, has the following advantages.

During long traveling of wheel type heavy equipment, the bucket is prevented from being separated from the bucket rest by draining a very small amount of high-pressure hydraulic fluid, which is fed to the boom cylinder or the arm cylinder, to the hydraulic tank side, and thus it is not required for an operator to adjust the position of boom and arm during the traveling of the heavy equipment to secure safe & comfort driving.

Although preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A hydraulic circuit for preventing a bucket separation from a bucket rest during transportation, the hydraulic circuit including:

first and second hydraulic pumps, a boom cylinder driven by shifting a spool for the boom cylinder installed in a flow path of the first hydraulic pump, an arm cylinder driven by shifting a spool for the arm cylinder installed in a flow path of the second hydraulic pump, a boom confluence logic valve for making a hydraulic fluid fed from the second hydraulic pump join a hydraulic fluid of the boom cylinder, a first port formed to connect with a chamber of the boom cylinder in a housing in which the spool for the boom cylinder is shiftably installed, a second port formed to connect with a hydraulic tank in the housing, and a first orifice formed between the housing and a land part of the spool for the boom cylinder located between the first port and the second port such that during transportation, any hydraulic fluid leaking from the second hydraulic pump to the chamber of the boom cylinder drains to the hydraulic tank through the first orifice to prevent a change of stroke of the boom cylinder, wherein the first orifice is larger than a second orifice formed between the housing and the land part of the spool for the boom cylinder and located between a high-pressure flow path formed in the housing and the first port.

2. A hydraulic circuit for preventing a bucket separation from a bucket rest during transportation, the hydraulic circuit including:

first and second hydraulic pumps, a boom cylinder driven by shifting of a spool for the boom cylinder installed in a flow path of the first hydraulic pump, an arm cylinder driven by shifting a spool for the arm cylinder installed in a flow path of the second hydraulic pump, a boom confluence logic valve for making a hydraulic fluid fed from the second hydraulic pump join a hydraulic fluid of the boom cylinder, a first port formed to connect with a first chamber of the boom cylinder in a housing in which the spool for the boom cylinder is shiftably installed, a second port formed to connect with a hydraulic tank in the housing, a first orifice formed between the housing and a land part of the spool for the arm cylinder located between the first port and the second port, a third port formed to connect with a second chamber of the arm cylinder in the housing, a fourth port formed to connect with the hydraulic tank in the housing, and a second orifice formed between the housing and the land part of the second spool located between the third port and the fourth port, the first and second orifices being arranged such that during transportation, any hydraulic fluid leaking from the second hydraulic pump to the first chamber of the arm cylinder drains to the hydraulic tank through the first orifice, and any hydraulic fluid leaking from the second hydraulic pump to the second chamber of the arm cylinder drains to the hydraulic tank through the second orifice to prevent a change of stroke of the arm cylinder, wherein the first orifice is larger than a third orifice formed between the housing and the land part of the spool for the arm cylinder located between a high-pressure flow path formed in the housing and the first port, and the second orifice is larger than a fourth orifice formed between the housing and the land part of the spool for the arm cylinder located between a high-pressure flow path formed in the housing and the third port.

* * * * *